US010564072B2

(12) United States Patent
Kim

(10) Patent No.: US 10,564,072 B2
(45) Date of Patent: Feb. 18, 2020

(54) VEHICLE DRIVING TEST APPARATUS AND METHOD

(71) Applicants: HYUNDAI MOTOR COMPANY, Seoul (KR); KIA MOTORS CORPORATION, Seoul (KR)

(72) Inventor: TaeJong Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 127 days.

(21) Appl. No.: 15/833,725

(22) Filed: Dec. 6, 2017

(65) Prior Publication Data

US 2018/0266920 A1  Sep. 20, 2018

(30) Foreign Application Priority Data

Mar. 15, 2017 (KR) .................. 10-2017-0032219

(51) Int. Cl.
G01M 17/06 (2006.01)
G07C 5/00 (2006.01)
G01S 19/04 (2010.01)
G01S 19/14 (2010.01)

(52) U.S. Cl.
CPC ............. *G01M 17/06* (2013.01); *G07C 5/008* (2013.01); *G01S 19/04* (2013.01); *G01S 19/14* (2013.01)

(58) Field of Classification Search
CPC ........ G01M 17/06; G01S 19/41; G01S 19/14; G01S 19/04; G05D 1/0278; G07C 5/008
See application file for complete search history.

(56) References Cited

U.S. PATENT DOCUMENTS

| 5,490,073 | A | * | 2/1996 | Kyrtsos | G01S 19/41 |
| | | | | | 342/357.24 |
| 6,061,613 | A | * | 5/2000 | Zyburt | G08G 1/20 |
| | | | | | 701/2 |
| 6,487,500 | B2 | * | 11/2002 | Lemelson | G01S 19/11 |
| | | | | | 340/436 |
| 6,711,495 | B1 | * | 3/2004 | Ukai | G01S 5/0027 |
| | | | | | 340/436 |
| 7,489,993 | B2 | * | 2/2009 | Coffee | B28C 5/422 |
| | | | | | 180/209 |

(Continued)

FOREIGN PATENT DOCUMENTS

| JP | 2006-101290 | * | 4/2006 |
| JP | 2015-227834 A | | 12/2015 |
| KR | 20050008378 | * | 1/2005 |

(Continued)

*Primary Examiner* — Michael J Zanelli
(74) *Attorney, Agent, or Firm* — Morgan, Lewis & Bockius LLP

(57) ABSTRACT

A vehicle driving test apparatus includes: a fixed position terminal that is fixed at a driving course and detects a fixed GPS signal; and a vehicular position terminal that is installed in a vehicle, detects a vehicle GPS signal per a predetermined time while the vehicle moves a predetermined distance, receives the fixed GPS signal from the fixed position terminal, sets the vehicle position based on the vehicle GPS signal and the fixed GPS signal, sets a reference line based on an entering angle of the vehicle, and tests a leaning state of the vehicle through the reference line and the vehicle position that is changed per the predetermined time.

15 Claims, 5 Drawing Sheets

(56) References Cited

U.S. PATENT DOCUMENTS

2013/0274953 A1* 10/2013 Miljkovic .............. G01C 21/00
                                                                                    701/1
2014/0214265 A1* 7/2014 Ashton ................... G06F 17/00
                                                                                    701/33.5

FOREIGN PATENT DOCUMENTS

| KR | 20070009089 | * | 1/2007 |
| --- | --- | --- | --- |
| KR | 10-0706540 B1 | | 4/2007 |
| KR | 10-1294088 B1 | | 8/2013 |
| KR | 101776568 | * | 9/2017 |

* cited by examiner

VEHICLE DRIVING TEST APPARATUS AND METHOD

CROSS-REFERENCE TO RELATED APPLICATION

This application is based on and claims the benefit of priority to Korean Patent Application No. 10-2017-0032219 filed on Mar. 15, 2017 with the Korean Intellectual Property Office, the entire contents of which are incorporated herein by reference.

TECHNICAL FIELD

The present disclosure relates to a vehicle driving test apparatus and a vehicle driving test method, and more particularly, to a vehicle driving test apparatus and a vehicle driving test method that may perform a vehicle driving test based on GPS signals of a fixed position terminal and a vehicular position terminal.

BACKGROUND

A vehicle manufacturer checks whether a manufactured vehicle is abnormal by driving the manufactured vehicle on a driving test course.

First, in a driving standby state for being driven on a driving test course, the vehicle is tested with respect to an idle RPM state, an engine malfunction, an engine starting state, whether an engine is delay-started, whether knocking of the engine occurs, whether a sudden start occurs, etc., and while the vehicle is being driven on rugged and curved sections, a steering wheel restoring force, absorption power of a suspension, etc., are tested. In addition, while the vehicle is being driven in high speed and braking sections, sudden acceleration, a gear shifting, an operation of a warning lamp, etc. are tested, and while the vehicle is being driven backward and in inclined sections, whether the vehicle pushes on an inclined road, an operation of a rear warning system, etc. are tested.

Further, while the vehicle is being driven on a straight course, a leaning phenomenon of the vehicle is tested. Generally, the leaning phenomenon of the vehicle is measured and tested by a fixed laser sensor installed at the driving test course. For example, a position of the vehicle is detected by each of a plurality of laser sensors, and the leaning phenomenon of the vehicle is tested through the position of the vehicle detected by the plurality of laser sensors.

However, when this method is used, since it is difficult to accurately measure an angle at which the vehicle enters, it is impossible to correct the angle, and it is impossible to determine how a test driver handles a steering wheel. Therefore, test reliability may deteriorate.

Moreover, it may be difficult to manage an inspection history due to an error of a barcode scanner that identifies the vehicle.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a vehicle driving test apparatus and method that may perform a vehicle driving test based on GPS signals of a fixed position terminal and a vehicular position terminal.

In addition, the present disclosure has been made in an effort to provide a vehicle driving test apparatus and method that may manage a test history based on vehicle identification information.

An exemplary embodiment of the present disclosure provides a vehicle driving test apparatus including: a fixed position terminal that is fixed at a driving course and detects a fixed GPS signal; and a vehicular position terminal that is installed in a vehicle, detects a vehicle GPS signal per a predetermined time while the vehicle moves a predetermined distance, receives the fixed GPS signal from the fixed position terminal, sets the vehicle position based on the vehicle GPS signal and the fixed GPS signal, sets a reference line based on an entering angle of the vehicle, and tests a leaning state of the vehicle through the reference line and the vehicle position that is changed per the predetermined time.

The vehicular position terminal may include a communicator receiving the fixed GPS signal from the fixed position terminal, a detector receiving a signal for the predetermined time from a GPS satellite to detect a plurality of vehicle GPS signals, and a controller that sets a plurality of vehicle positions that are changed per the predetermined time based on the fixed GPS signal and the vehicle GPS signal, sets the reference line based on the entering angle of the vehicle, and tests the leaning state of the vehicle through the reference line, the plurality of vehicle positions, and a moving speed of the vehicle.

The vehicular position terminal may set the vehicle position by correcting the vehicle GPS signal through the fixed GPS signal.

The vehicular position terminal may generate a moving angle of the vehicle through the reference line and the vehicle position, generate a plurality of changed position amounts that are changed per the predetermined time through the moving angle, the moving speed, and the predetermined time, and test the leaning state of the vehicle based on the plurality of changed position amounts.

The vehicular position terminal may generate a final leaning amount by adding the plurality of changed position amounts, and test a leaning state of the vehicle based on the final leaning amount.

The vehicle driving test apparatus may further include a connector installed in the vehicle and transmitting vehicle identification information to the vehicular position terminal.

The vehicular position terminal may transmit the vehicle identification information received from the connector and a test result with respect to the leaning test of the vehicle to a history management device.

The vehicular position terminal may receive a steering wheel angle and a steering torque from the connector, and determine an error of the leaning test of the vehicle based on the steering wheel angle and the steering torque.

When the steering wheel angle is equal to or greater than a reference angle, the vehicular position terminal may determine whether the steering torque is equal to or greater than a reference torque, and when the steering torque is equal to or greater than the reference torque, the vehicular position terminal may determine that a test error exists.

Another embodiment of the present disclosure provides a vehicle driving test method in a vehicular position terminal communicating with a fixed position terminal, including: receiving a fixed GPS signal from the fixed position terminal; detecting a vehicle GPS signal per a predetermined time while a vehicle moves a predetermined distance; setting a plurality of vehicle positions that are changed per the predetermined time based on the fixed GPS signal and the vehicle GPS signal; setting a reference line based on an entering angle of the vehicle; and testing a leaning state of the vehicle through the reference line and the plurality of vehicle positions.

In the setting of the vehicle position, the vehicle GPS signal may be corrected through the fixed GPS signal.

In the testing of the leaning state of the vehicle, the leaning state of the vehicle may be tested through the reference line, the plurality of vehicle positions, and a moving speed of the vehicle.

The testing of the leaning state of the vehicle may include: generating a moving angle of the vehicle through the reference line and the vehicle position; generating a plurality of changed position amounts that are changed per the predetermined time through the moving angle, the moving speed, and the predetermined time; and testing the leaning state of the vehicle based on the changed position amounts.

The changed position amounts may generated by Equation 1.

$$Dx = \mathrm{Sin}(Ax) \times Vx \times Tx,\qquad \text{[Equation 1]}$$

Herein, Dx represents the changed position amounts, Ax is the moving angle, Vx is the moving speed, and Tx is the predetermined time.

The testing of the leaning state of the vehicle may include: generating a final leaning amount through the plurality of changed position amounts; and testing the leaning state of the vehicle based on the final leaning amount.

The final leaning amount is calculated by Equation 2.

$$F = \sum_{x=1}^{n} Dx, \qquad \text{[Equation 2]}$$

Herein, F is the final leaning amount, and Dx represents the changed position amounts.

The vehicle driving test method may further include, after the testing of the leaning state of the vehicle, transmitting the final leaning amount and vehicle identification information to a history management device.

The vehicle driving test method may further include: checking a steering wheel angle and a steering torque; determining whether the steering wheel angle is equal to or greater than a reference angle; determining, when the steering wheel angle is equal to or greater than the reference angle, whether the steering torque is equal to or greater than a reference torque; and determining, when the steering torque is equal to or greater than the reference torque, a state in which the steering torque is equal to or greater than the reference torque to be a test error.

According to the embodiment of the present disclosure, it is possible to measure an entry position of a vehicle in real time, and it is possible to test a leaning phenomenon of the vehicle based on respective GPS signals of a fixed position terminal and a vehicular position terminal, thereby improving test reliability.

In addition, it is possible to manage a test history with respect to leaning of the vehicle based on vehicle identification information, thereby efficiently managing a driving test of the vehicle.

DETAILED DESCRIPTION

The operation principle of a vehicle driving test apparatus and method according an exemplary embodiment of the present disclosure will be described hereafter in detail with reference to the accompanying drawings. However, the drawings to be described below and the following detailed description relate to one preferred exemplary embodiment of various exemplary embodiments for effectively explaining the characteristics of the present disclosure. Therefore, the present disclosure should not be construed as being limited to the drawings and the following description.

Further, in the description of the present disclosure, the detailed description of related well-known configurations and functions is not provided when it is determined that it unnecessarily makes the scope of the present disclosure unclear. Further, the terminologies to be described below are ones defined in consideration of their function in the present disclosure and may be changed by the intention of a user or an operator, or a custom. Therefore, their definitions should be based on the description of the present disclosure.

Further, in the following exemplary embodiments, the terminologies are appropriately changed, combined, or divided so that those skilled in the art can clearly understand them, in order to efficiently explain the main technical characteristics of the present disclosure, but the present disclosure is not limited thereto.

Hereinafter, exemplary embodiments of the present disclosure will be described in detail with reference to the accompanying drawings.

Figure 1:
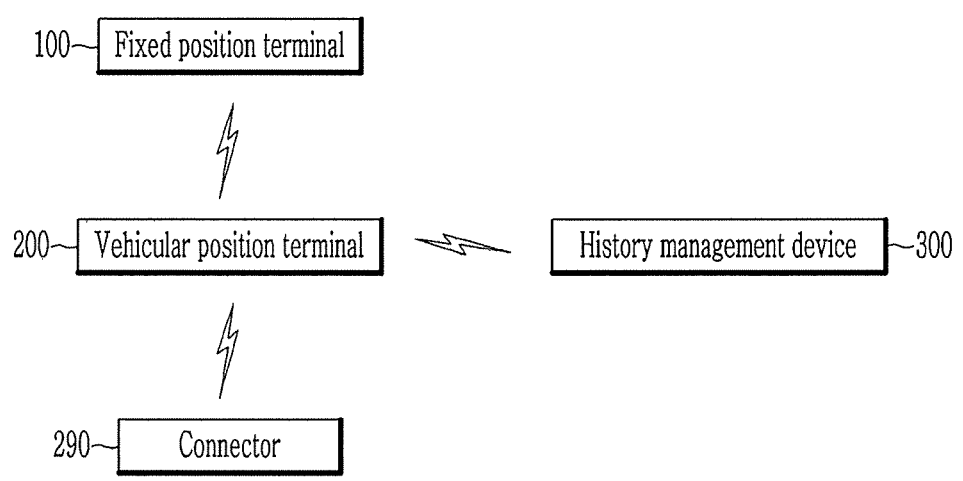
FIG. 1 illustrates a schematic view of a vehicle driving test apparatus according to an exemplary embodiment of the present disclosure.

FIG. 1 illustrates a schematic view of a vehicle driving test apparatus according to an exemplary embodiment of the present disclosure.

Referring to FIG. 1, a vehicle driving test apparatus includes a fixed position terminal 100, a vehicular position terminal 200, and a connector 290.

The fixed position terminal 100 is fixedly installed at a side of a driving course on which a driving test of a vehicle is performed.

The fixed position terminal 100 receives a reception signal from a GPS satellite to detect a fixed GPS signal. The fixed position terminal 100 may detect the fixed GPS signal that is changed per a predetermined time. By comparing an absolute position of the fixed position terminal 100 and the fixed GPS signal, error data may be calculated.

The fixed position terminal 100 accesses the vehicular position terminal 200 to transmit the fixed GPS signal to the vehicular position terminal 200.

The vehicular position terminal 200 detects the GPS signal of the vehicle while the vehicle moves a predetermined distance. The vehicular position terminal 200 receives the fixed GPS signal from the fixed position terminal 100, and sets a positon of the vehicle through the fixed GPS signal and the vehicle GPS signal. For example, the vehicular position terminal 200 may accurately set the position of the vehicle by correcting the vehicle GPS signal through the fixed GPS signal.

The vehicular position terminal 200 sets a reference line based on an entering angle of the vehicle. The entering angle of the vehicle may be determined based on a driving direction of the vehicle just before the leaning test of the vehicle is started. The vehicular position terminal 200 tests the leaning of the vehicle through the reference line and the vehicle position.

The vehicular position terminal 200 is connected to a history management device 300. The vehicular position terminal 200 transmits a test result to the history management device 300. The vehicular position terminal 200 will be described in detail with reference to FIG. 2.

The history management device 300 accesses the vehicular position terminal 200 to receive information from the vehicular position terminal 200. In other words, the history management device 300 receives the vehicle identification information and the test result from the vehicular position terminal 200. The history management device 300 matches the test result to the vehicle identification information received from the vehicular position terminal 200 and then manages them.

The connector 290 is provided in the vehicle. The connector 290 may correspond to an on-board diagnostics (OBD) device.

The connector 290 accesses the vehicular position terminal 200 to transmit information to the vehicular position terminal 200. In other words, the connector 290 transmits the vehicle identification information to the vehicular position terminal 200. The vehicle identification information, which may identify the vehicle, may be represented by letters, numbers, symbols, and the like.

The connector 290, while the vehicle is being driven, transmits a steering wheel angle and a steering torque to the vehicular position terminal 200. The steering torque may correspond to a force applied to a steering wheel by a worker, that is, a driver.

Figure 2:
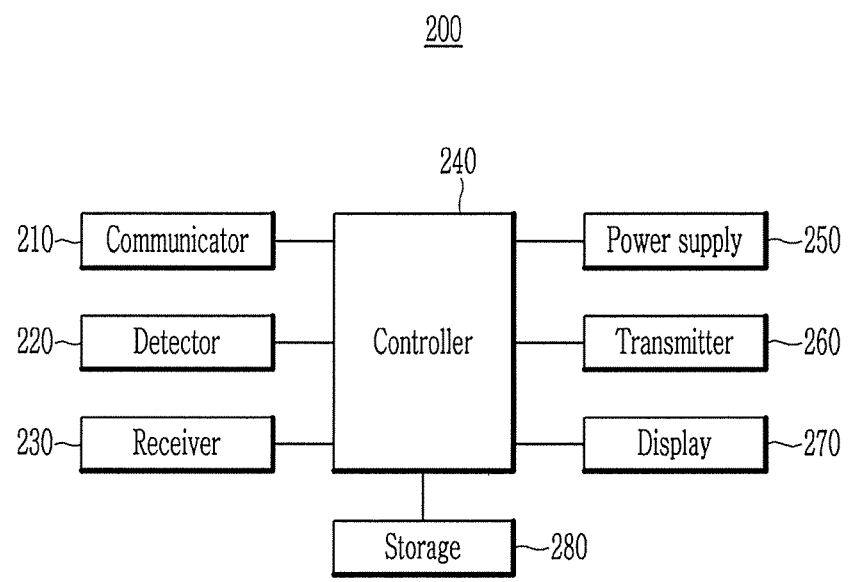
FIG. 2 illustrates a schematic view of a vehicular position terminal of a vehicle driving test apparatus according to an exemplary embodiment of the present disclosure.

FIG. 2 illustrates a schematic view of a vehicular position terminal of a vehicle driving test apparatus according to an exemplary embodiment of the present disclosure.

Referring to FIG. 2, the vehicular position terminal 200 includes a communicator 210, a detector 220, a receiver 230, a controller 240, a power supply 250, a transmitter 260, a display 270, and a storage 280.

The communicator 210, a hardware device implemented with various electronic circuits, is connected to the fixed position terminal 100 through wireless communication, and receives the fixed GPS signal from the fixed position terminal 100. The wireless communication may be at least one of Bluetooth, infrared data association (IrDA), WiFi, wireless LAN, radio frequency (RF) communication, near field communication (NFC), and ZigBee.

The communicator 210 provides the received fixed GPS signal to the controller 240.

The detector 220, a hardware device implemented with various electronic circuits, while the vehicle is being driven, receives a signal from the GPS satellite, and detects the vehicle GPS signal through the received signal. The detector 220 may receive a signal per a predetermined time to detect the vehicle GPS signal. Herein, the predetermined time may be preset for detecting the vehicle GPS signal.

The receiver 230, a hardware device implemented with various electronic circuits, is connected to the connector 290 through the wireless communication to receive information for the driving test from the connector 290. For example, the receiver 230 receives the vehicle identification information, the steering wheel angle, and the steering torque from the connector 290. Herein, the vehicle identification information may correspond to vehicle identification number (VIN) information. Short-range wireless communication may be at least one of Bluetooth, infrared data association (IrDA), WiFi, wireless LAN, radio frequency (RF) communication, near field communication (NFC), and Zig Bee.

The receiver 230 provides the vehicle identification information, the steering wheel angle, and the steering torque to the controller 240.

The controller 240 controls the communicator 210, the detector 220, the receiver 230, the power supply 250, the transmitter 260, the display 270, and the storage 280, which are constituent elements of the vehicular position terminal 200.

The controller 240 is an electric circuitry that executes instructions of software which thereby performs various functions described hereinafter.

The controller 240 sets a plurality of changed vehicle positions per a predetermined time based on the fixed GPS signal and a plurality of the vehicle GPS signals.

The controller 240 sets the reference line, and generates changed position amounts through the reference line and the plurality of vehicle positions.

The controller 240 generates a final leaning amount through the changed position amounts, and tests the leaning of the vehicle through the final leaning amount. In this case, the controller 240 may generate the final leaning amount by adding the changed position amounts.

For this, the controller 240 may be implemented with at least one processor executed by a predetermined program, and the predetermined program may include a series of commands for performing each step included in a driving test method according to an exemplary embodiment of the present disclosure. The driving test method will be more specifically described with reference to FIG. 3 to FIG. 5.

The power supply 250 supplies power required for the vehicular position terminal 200 to operate. The power supply 250 may be combined with a battery.

The transmitter 260, a hardware device implemented with various electronic circuits, is connected to the history management device 300, and transmits the test result to the history management device 300. For example, the transmitter 260 transmits the vehicle identification information and the test result to the history management device 300 depending on control of the controller 240.

The display 270 displays operation information and result information occurring while the vehicular position terminal 200 operates. For example, the display 270 may display the fixed GPS signal received through the receiver 230 and the vehicle GPS signal detected by the detector 220. The display 270 may display the reference line set by the controller 240 and the vehicle position. The display 270 may display the changed position amounts and the final leaning amount generated by the controller 240.

The display 270 may be replaced by any types of display devices, as long as they may display the operation information and the result information. For example, the display 270 may be one of a liquid crystal display (LCD), an organic light emitting display (OLED), an electrophoretic display (EPD), and a light emitting diode (LED) display device.

The storage 280 stores information required by the constituent elements of the vehicular position terminal 200 and information generated by the constituent elements of the vehicular position terminal 200. For example, the storage 280 may store the fixed GPS signal received through the receiver 230 and the vehicle GPS signal detected by the detector 220. The storage 280 may store the reference line set by the controller 240 and the vehicle position. The storage 280 may store the changed position amounts and the final leaning amount generated by the controller 240.

The storage 280 stores programs for controlling a general operation of the vehicular position terminal 200.

The storage 280 may provide necessary information to the communicator 210, the detector 220, the receiver 230, the controller 240, the transmitter 260, and the display 270 which are the constituent elements of the vehicular position terminal 200, in response to requests therefrom.

The storage 280 may be an integrated memory or may be subdivided into a plurality of memories. For example, the storage 280 may include a read only memory (ROM), a random access memory (RAM), a flash memory, or the like.

Hereinafter, a vehicle driving test method will be described with reference to FIG. 3 to FIG. 5.

Figure 3:
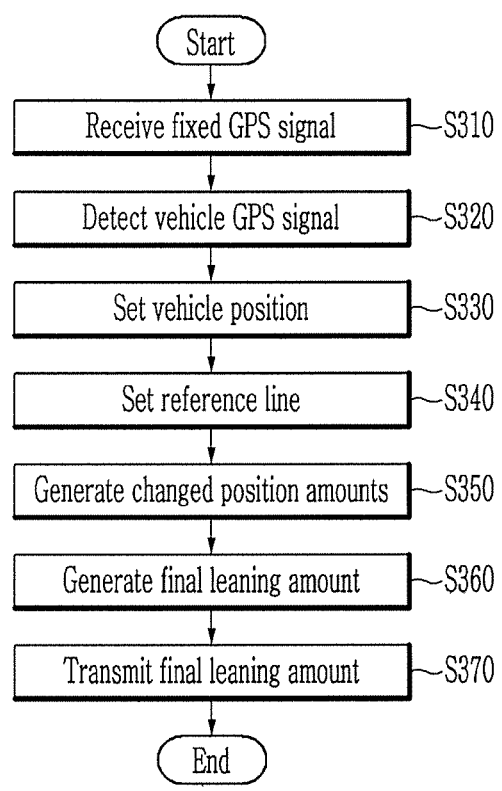
FIG. 3 illustrates a flowchart of a vehicle driving test method according to an exemplary embodiment of the present disclosure.
Figure 4:
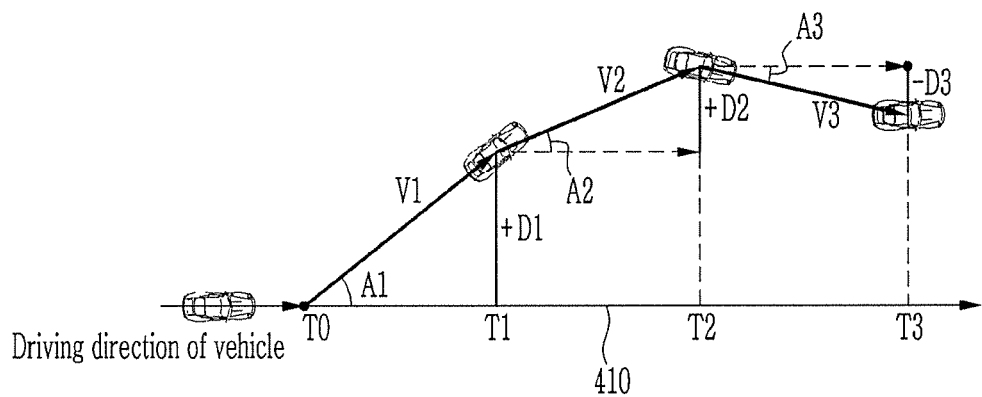
FIG. 4 illustrates an exemplary view for explaining a vehicle driving test method according to an exemplary embodiment of the present disclosure.

FIG. 3 illustrates a flowchart of a vehicle driving test method according to an exemplary embodiment of the present disclosure, and FIG. 4 illustrates an exemplary view for explaining a vehicle driving test method according to an exemplary embodiment of the present disclosure. Since respective constituent elements of the vehicular position terminal 200 according to the exemplary embodiment of the present disclosure described above with reference to FIG. 2 may be integrated or subdivided, it should be understood that constituent elements capable of those functions described above may be the constituent elements of the vehicular position terminal 200 according to the exemplary embodiment of the present disclosure, irrespective of the names. Thus, a vehicle driving test method according to an exemplary embodiment of the present disclosure will now be described under the assumption that a subject of each step is not the corresponding constituent element, but the vehicular position terminal 200.

Referring to FIG. 3, the vehicular position terminal 200 receives the fixed GPS signal from the fixed position terminal 100 (S310). In other words, the fixed position terminal 100 receives a signal from the GPS satellite for performing the leaning test to detect the fixed GPS signal. The fixed position terminal 100 transmits the detected fixed GPS signal to the vehicular position terminal 200.

The vehicular position terminal 200 detects the vehicle GPS signal (S320). In other words, the vehicular position terminal 200, while the vehicle moves a predetermined distance, receives the signal from the GPS satellite per a predetermined time to detect the vehicle GPS signal. In this case, the predetermined distance may be a preset distance for performing the leaning test. For example, while moving a predetermined distance, the vehicular position terminal 200 detects vehicle GPS signals at predetermined times T0, T1, T2, and T3 as shown in FIG. 4.

The vehicular position terminal 200 sets the vehicle position through the fixed GPS signal and the vehicle GPS signal (S330). For example, the vehicular position terminal 200 sets the vehicle position by correcting the vehicle GPS signal through the fixed GPS signal. In this case, the vehicular position terminal 200 may correct the vehicle GPS signal detected per a predetermined time through the fixed GPS signal received per a predetermined time.

Thus, the vehicular position terminal 200 may correct the vehicle GPS signal through the fixed GPS signal, thereby improving position precision.

The vehicular position terminal 200 sets the reference line based on the entering angle of the vehicle (S340). For example, the vehicular position terminal 200, as shown in FIG. 4, may set the reference line 410.

The vehicular position terminal 200 generates the changed position amounts through the reference line and the vehicle position (S350). Specifically, the vehicular position terminal 200 generates a moving angle of the vehicle through the reference line and the vehicle position. For example, the vehicular position terminal 200 may calculate a moving distance based on a moving speed, and may generate a moving angle through the moving distance, the reference line, and the vehicle position. For example, the vehicular position terminal 200 may generate the moving angle of the vehicle (A1, A2, and A3) depending on a plurality of predetermined times, respectively.

The vehicular position terminal 200 generates a plurality of changed position amounts that are changed per the predetermined time through the moving angle, moving speed, and the predetermined time.

For example, the vehicular position terminal 200 may generate the changed position amounts through Equation 1.

$$Dx = \operatorname{Sin}(Ax) \times Vx \times Tx \qquad \text{[Equation 1]}$$

In Equation 1, Dx represents the changed position amounts, Ax is the moving angle, Vx is the moving speed, and Tx is the predetermined time. In addition, x may be an integer of 0 or more.

The vehicular position terminal 200 generates the final leaning amount through the changed position amounts (S360). For example, the vehicular position terminal 200 generates the final leaning amount through Equation 2.

$$F = \sum_{x=1}^{n} Dx \qquad \text{[Equation 2]}$$

In Equation 2, F is the final leaning amount, and Dx represents the changed position amounts.

For example, the vehicular position terminal 200, as shown in FIG. 4, may generate the final leaning amount (D1+D2+−D3).

The vehicular position terminal 200 transmits the final leaning amount to the history management device 300 (S370). The vehicular position terminal 200 checks the vehicle identification information received from the connector 290. The vehicular position terminal 200 transmits the vehicle identification information and the final leaning amount to the history management device 300. In this case, the history management device 300 may match the final leaning amount to the vehicle identification information to manage it.

Figure 5:
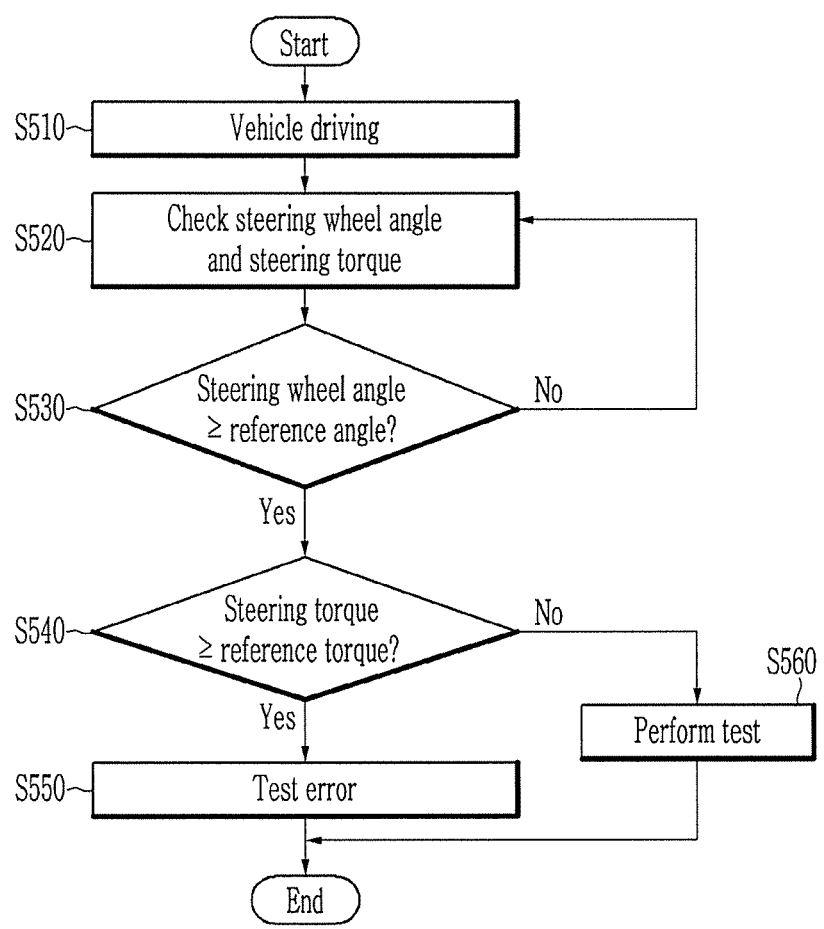
FIG. 5 illustrates a flowchart for determining a test error in a vehicle driving test method according to an exemplary embodiment of the present disclosure.

FIG. 5 illustrates a flowchart for determining a test error in a vehicle driving test method according to an exemplary embodiment of the present disclosure.

Referring to FIG. 5, when the vehicle is driven for a driving test (S510), the vehicular position terminal 200 checks the steering wheel angle and the steering torque (S520). In other words, the connector 290, when the vehicle starts driving, detects the steering wheel angle and the steering torque, and transmits the detected steering wheel angle and steering torque to the vehicular position terminal 200. The vehicular position terminal 200 receives the steering wheel angle and the steering torque from the connector 290, and then checks them.

The vehicular position terminal 200 determines whether the steering wheel angle is equal to or greater than the reference angle (S530). Herein, the reference angle, which corresponds to an angle for determining the movement of the steering wheel, may have a predetermined value. The reference angle may be set by a worker (or test driver), or may be set through a predetermined algorithm (e.g., a program or a probability model).

The vehicular position terminal 200, when the steering wheel angle is less than the reference angle, returns to step S520 to check the steering wheel angle and the steering angle.

The vehicular position terminal 200, when the steering wheel angle is equal to or greater than the reference angle, determines whether the steering torque is equal to or greater than a reference torque (S540). In this case, the reference torque is one for determining that the driver, as the worker, handles the steering wheel, and it may have a predetermined value. The reference torque may be set by a worker (or test driver), or may be set through a predetermined algorithm (e.g., a program or a probability model).

The vehicular position terminal 200, when the steering torque is equal to or greater than the reference torque, determines it to be a test error (S550). That is, when the steering torque is equal to or greater than the reference torque, since the worker handles the steering wheel, the vehicular position terminal 200 determines it to be the test error, and then stops the driving test.

The vehicular position terminal 200, when the steering torque is less than the reference torque, proceeds to perform the driving test (S560).

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle driving test apparatus comprising:
   a fixed position terminal that is fixed at a driving course and detects a fixed GPS signal;
   a vehicular position terminal that is installed in a vehicle, detects a vehicle GPS signal per a predetermined time while the vehicle moves a predetermined distance, receives the fixed GPS signal from the fixed position terminal, sets the vehicle position based on the vehicle GPS signal and the fixed GPS signal, sets a reference line based on an entering angle of the vehicle, and tests a leaning state of the vehicle through the reference line and the vehicle position that is changed per the predetermined time; and
   a connector installed in the vehicle and transmitting vehicle identification information to the vehicular position terminal.

2. The vehicle driving test apparatus of claim 1, wherein the vehicular position terminal includes:
   a communicator receiving the fixed GPS signal from the fixed position terminal;
   a detector receiving a signal per the predetermined time from a GPS satellite to detect a plurality of vehicle GPS signals; and
   a controller that sets a plurality of vehicle positions that are changed per the predetermined time based on the fixed GPS signal and the vehicle GPS signal, sets the reference line based on the entering angle of the vehicle, and tests the leaning state of the vehicle through the reference line, the plurality of vehicle positions, and a moving speed of the vehicle.

3. The vehicle driving test apparatus of claim 1, wherein the vehicular position terminal sets the vehicle position by correcting the vehicle GPS signal through the fixed GPS signal.

4. The vehicle driving test apparatus of claim 1, wherein the vehicular position terminal generates a moving angle of the vehicle through the reference line and the vehicle position, generates a plurality of changed position amounts that are changed per the predetermined time through the moving angle, a moving speed, and the predetermined time, and tests the leaning state of the vehicle based on the plurality of changed position amounts.

5. The vehicle driving test apparatus of claim 4, wherein the vehicular position terminal generates a final leaning amount by adding the plurality of changed position amounts, and tests a leaning state of the vehicle based on the final leaning amount.

6. The vehicle driving test apparatus of claim 1, wherein the vehicular position terminal transmits the vehicle identification information received from the connector and a test result with respect to the leaning test of the vehicle to a history management device.

7. The vehicle driving test apparatus of claim 1, wherein the vehicular position terminal receives a steering wheel angle and a steering torque from the connector, and determines an error of the leaning test of the vehicle based on the steering wheel angle and the steering torque.

8. The vehicle driving test apparatus of claim 7, wherein when the steering wheel angle is equal to or greater than a reference angle, the vehicular position terminal determines whether the steering torque is equal to or greater than a reference torque, and when the steering torque is equal to or greater than the reference torque, the vehicular position terminal determines that a test error exists.

9. A vehicle driving test method in a vehicular position terminal communicating with a fixed position terminal, comprising:
   receiving a fixed GPS signal from the fixed position terminal;
   detecting a vehicle GPS signal per a predetermined time while a vehicle moves a predetermined distance;
   setting a plurality of vehicle positions that are changed per a predetermined time based on the fixed GPS signal and the vehicle GPS signal;
   setting a reference line based on an entering angle of the vehicle; and
   testing a leaning state of the vehicle through the reference line and the plurality of vehicle positions,
   wherein the testing of the leaning state of the vehicle includes:
   generating a moving angle of the vehicle through the reference line and the vehicle position;
   generating a plurality of changed position amounts that are changed per the predetermined time through the moving angle, a moving speed, and the predetermined time;
   testing the leaning state of the vehicle based on the changed position amounts;
   generating a final leaning amount through the plurality of changed position amounts; and
   testing the leaning state of the vehicle based on the final leaning amount.

10. The vehicle driving test method of claim 9, wherein in the setting of the vehicle position,
the vehicle GPS signal is corrected through the fixed GPS signal.

11. The vehicle driving test method of claim 9, wherein in the testing of the leaning state of the vehicle,
the leaning state of the vehicle is tested through the reference line, the plurality of vehicle positions, and the moving speed of the vehicle.

12. The vehicle driving test method of claim 9, wherein the changed position amounts are generated by Equation 1:

$$Dx = \operatorname{Sin}(Ax) \times Vx \times Tx, \qquad \text{[Equation 1]}$$

wherein Dx represents the changed position amounts, Ax is the moving angle, Vx is the moving speed, and Tx is the predetermined time.

13. The vehicle driving test method of claim 9, wherein the final leaning amount is calculated by Equation 2:

$$F = \sum_{x=1}^{n} Dx \qquad \text{[Equation 2]}$$

wherein F is the final leaning amount, and Dx represents the changed position amounts.

14. The vehicle driving test method of claim 9, further comprising,
after the testing of the leaning state of the vehicle,
transmitting the final leaning amount and vehicle identification information to a history management device.

15. The vehicle driving test method of claim 9, further comprising:
checking a steering wheel angle and a steering torque;
determining whether the steering wheel angle is equal to or greater than a reference angle;
determining, when the steering wheel angle is equal to or greater than the reference angle, whether the steering torque is equal to or greater than a reference torque; and
determining, when the steering torque is equal to or greater than the reference torque, a state in which the steering torque is equal to or greater than the reference torque to be a test error.

* * * * *